(12) United States Patent
Bae et al.

(10) Patent No.: US 9,219,946 B2
(45) Date of Patent: *Dec. 22, 2015

(54) METHOD OF PROVIDING CONTENTS INFORMATION FOR A NETWORK TELEVISION

(75) Inventors: Wonchul Bae, Pyeongtaek-si (KR); Daesuk Park, Pyeongtaek-si (KR); Eunseon Ahn, Pyeongtaek-si (KR); Jaeuk Kim, Pyeongtaek-si (KR)

(73) Assignee: LG Electronics Inc., Seoul (KR)

( * ) Notice: Subject to any disclaimer, the term of this patent is extended or adjusted under 35 U.S.C. 154(b) by 221 days.

This patent is subject to a terminal disclaimer.

(21) Appl. No.: 12/938,626

(22) Filed: Nov. 3, 2010

(65) Prior Publication Data

US 2011/0119707 A1    May 19, 2011

(30) Foreign Application Priority Data

Nov. 16, 2009  (KR) .................. 10-2009-0110151
Dec. 22, 2009  (KR) .................. 10-2009-0128943

(51) Int. Cl.
*G06F 3/00* (2006.01)
*G06F 13/00* (2006.01)
*H04N 5/445* (2011.01)
*H04N 21/462* (2011.01)
*H04N 5/50* (2006.01)
*H04N 5/775* (2006.01)
*H04N 21/45* (2011.01)
*H04N 21/472* (2011.01)
(Continued)

(52) U.S. Cl.
CPC ....... *H04N 21/4622* (2013.01); *H04N 5/44543* (2013.01); *H04N 5/50* (2013.01); *H04N 5/775* (2013.01); *H04N 21/4532* (2013.01); *H04N 21/472* (2013.01); *H04N 21/482* (2013.01); *H04N 21/8586* (2013.01)

(58) Field of Classification Search
CPC . H04N 21/472; H04N 4/482; H04N 21/8586; H04N 21/4622; H04N 21/4532; H04N 5/44543; H04N 5/50; H04N 5/775
USPC .......................................... 725/39, 43, 46, 59
See application file for complete search history.

(56) References Cited

U.S. PATENT DOCUMENTS 6,665,838 B1 * 12/2003 Brown et al. .................. 715/205
6,982,780 B2 *  1/2006 Morley et al. ................... 352/38
7,224,409 B2 *  5/2007 Chin et al. ..................... 348/732

(Continued)

FOREIGN PATENT DOCUMENTS

KR  10-2005-0004847 A  1/2005
KR  10-2008-0073443 A  8/2008

(Continued)

OTHER PUBLICATIONS

PCT International Search Report dated Jan. 26, 2011 issued in Application No. PCT/KR2010/003865.

(Continued)

*Primary Examiner* — Jonathan V Lewis
(74) *Attorney, Agent, or Firm* — KED & Associates LLP

(57) ABSTRACT

Embodiments provide a method that allows users for easily acquire contents information by receiving and displaying only providable contents lists without connecting to servers of a plurality of contents providers, in a network TV that can receive and play contents while being connected with the contents providers.

17 Claims, 12 Drawing Sheets

(51) Int. Cl.
 *H04N 21/482* (2011.01)
 *H04N 21/858* (2011.01)

(56) References Cited

U.S. PATENT DOCUMENTS

| | | | |
|---|---|---|---|
| 7,373,650 B1* | 5/2008 | Rodriguez et al. | 725/41 |
| 7,496,845 B2* | 2/2009 | Deutscher et al. | 715/726 |
| 7,689,933 B1 | 3/2010 | Parsons | 715/838 |
| 7,712,117 B1* | 5/2010 | Mohr | 725/41 |
| 8,069,414 B2* | 11/2011 | Hartwig et al. | 715/719 |
| 8,151,301 B2* | 4/2012 | Bennett | 725/41 |
| 8,386,954 B2* | 2/2013 | San Jule et al. | 715/781 |
| 8,429,530 B2* | 4/2013 | Neuman et al. | 715/716 |
| 9,024,864 B2* | 5/2015 | Dunton et al. | 345/156 |
| 9,038,110 B2* | 5/2015 | Kvache | 725/53 |
| 9,088,375 B2* | 7/2015 | Ito et al. | 1/1 |
| 2004/0107439 A1* | 6/2004 | Hassell et al. | 725/44 |
| 2004/0148631 A1* | 7/2004 | Zubowicz | 725/53 |
| 2005/0108752 A1* | 5/2005 | Nishikawa et al. | 725/39 |
| 2006/0069736 A1* | 3/2006 | Czeisler et al. | 709/207 |
| 2006/0176404 A1* | 8/2006 | Fujii et al. | 348/607 |
| 2006/0248570 A1* | 11/2006 | Witwer | 725/135 |
| 2006/0271594 A1* | 11/2006 | Haberman | 707/104.1 |
| 2007/0073845 A1* | 3/2007 | Reisman | 709/219 |
| 2007/0079352 A1* | 4/2007 | Klein, Jr. | 725/135 |
| 2007/0124769 A1* | 5/2007 | Casey et al. | 725/46 |
| 2007/0277218 A1* | 11/2007 | Borden | 725/135 |
| 2008/0077852 A1 | 3/2008 | Fleishman et al. | 715/234 |
| 2008/0086747 A1* | 4/2008 | Rasanen et al. | 725/46 |
| 2008/0124057 A1* | 5/2008 | Choi et al. | 386/124 |
| 2008/0301591 A1* | 12/2008 | McArdle | 715/854 |
| 2009/0019023 A1 | 1/2009 | Arrouye et al. | 707/4 |
| 2009/0089184 A1* | 4/2009 | Boush | 705/27 |
| 2009/0097748 A1 | 4/2009 | Lee et al. | 382/173 |
| 2009/0282340 A1 | 11/2009 | Akaike et al. | 715/732 |
| 2010/0114857 A1* | 5/2010 | Edwards et al. | 707/709 |
| 2010/0125882 A1* | 5/2010 | Athias | 725/88 |
| 2010/0192175 A1 | 7/2010 | Bachet et al. | |
| 2010/0251304 A1* | 9/2010 | Donoghue et al. | 725/46 |
| 2010/0325652 A1 | 12/2010 | Lee et al. | 725/28 |

FOREIGN PATENT DOCUMENTS

| | | |
|---|---|---|
| KR | 10-2009-0038706 A | 4/2009 |
| WO | WO 2006/074267 A2 | 7/2006 |

OTHER PUBLICATIONS

United States Office Action dated Feb. 16, 2012 issued in U.S. Appl. No. 12/817,010.

Anonymous: "theinfo.com—Search for movie information; shop for videos", Theinfo.com; Oct. 11, 1999; XP055059261; Retrieved from the Internet: URL: http://web.archive.org/web/19991011204834/http://www.theinfo.com/movies/ [retrieved on 2013-0-11].

Anonymous: "Google image slideshow", Halfbakery; Feb. 1, 2009; XP055059357; Retrieved from the Internet: URL:http://web.archive.org/web/20090201063233/http://www.halfbakery.com/idea/google_20image_20slideshow [retrieved on Apr. 12, 2013].

European Search Report for Application No. 10830090.6-1908 dated May 14, 2013.

U.S. Office Action issued in co-pending U.S. Appl. No. 12/817,010 dated May 8, 2014.

U.S. Office Action for Application U.S. Appl. No. 12/817,010 dated Sep. 12, 2013.

Korean Office Action dated Sep. 24, 2015 issued in Application No. 10-2009-0110151.

\* cited by examiner

FIG.14

USER DESIGNATED CONTENTS UPDATE INFORMATION

| CONTENTS PROVIDER | TITLE | UPDATE LIST |
|---|---|---|
| B | bbb | EPISODE 4 OF SEASON 2 HAS BEEN UPDATED |
| D | ddd | EPISODE 2 HAS BEEN UPDATED |
| ⋮ | ⋮ | |

METHOD OF PROVIDING CONTENTS INFORMATION FOR A NETWORK TELEVISION

BACKGROUND OF THE INVENTION

1. Field of the Invention

Embodiments relate to a network TV that can receive contents through a network and play the contents.

In more detail, embodiments provide a method that allows users for easily acquire contents information by receiving and displaying only providable contents lists without connecting to servers of a plurality of contents providers, in a network TV that can receive and play contents while being connected with the contents providers.

2. Description of the Conventional Art

As the digital TV technology based on the digital technology has been developed and commercialized, from the existing analog broadcasting, it has become possible to provide users with a variety of contents services, such as real-time broadcasting, COD (Contents on Demand), games, and news, using the Internet network provided in each home, other than the existing radio media.

An IPTV (Internet Protocol TV) can be an example of the contents services provided through the internet network. The IPTV is to transmit and provide various information services, video contents, and broadcasting to televisions of users, using the high-speed internet network.

Recently, a broadband TV and a web TV etc. has been proposed, as a type of network TV that further progresses than the IPTV. Unlike the existing IPTV, in the broadband TV or web TV, there are several contents providers and a user can be provided with contents that the contents providers provide, such as various VODs, games, visual telephone services, by individually connecting to the several contents providers.

It was required to individually connect to a contents provider server in order to check contents lists provided from the existing service contents provider, in the network TV. A method of easily receiving information on contents provided from a plurality of contents providers.

SUMMARY OF THE INVENTION

An embodiment provides a method of providing contents information in a display apparatus connectable to a network, which includes: requesting a plurality of contents provider to transmit contents lists; receiving the requested contents lists and location information of contents included in the lists from the contents providers; and displaying the received contents lists for each contents provider, in which the contents included in the contents lists are linked on the basis of the location information.

Another embodiment provides a display apparatus connectable to a network, which includes: a network interface unit that receives providable contents lists and URL (Uniform Resource Locator) information on contents included in the contents lists, from a plurality of contents providers; a user interface unit that receives user's input; a display unit that displays a plurality of contents lists corresponding to the contents providers, respectively; and a control unit that links the contents included in the contents lists with the received URL information.

Meanwhile, the method of providing contents information can be implemented by a computer-readable media where a program executed by a computer is recorded.

BRIEF DESCRIPTION OF THE DRAWING

FIG. 14 is a diagram showing a screen providing update information of user-designated contents, in accordance with an embodiment of the present invention;

DETAILED DESCRIPTION OF THE PREFERRED EMBODIMENT

Hereinafter, embodiments of the present invention will be described in detail with reference to the accompanying drawings.

Figure 1:
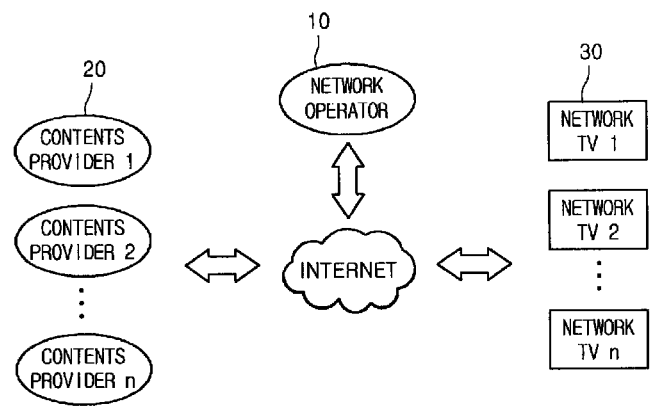
FIG. 1 is a view showing the network configuration of a network TV system according to an embodiment of the present invention.

FIG. 1 is a view showing the network configuration of a network TV system according to an embodiment of the present invention.

Referring to FIG. 1, the system of a network TV according to an embodiment of the present invention may be composed of a network operator 10, at leas one contents provider (CP) 20, and at least on network TV 30, which are connected with each other by a network, for example, internet.

The network operator 10 provides the network TV 30 with basic software required for contents provided from the contents provider 20 to normally operate in the network TV 30, or software for the network TV to operate. Further, the contents provider 20 is provided with hardware information of the network TV 30 which is required for the contents to normally operate in the network TV 30.

For example, the network operator 10 provides a main image frame required to provide the network TV 30 with the contents provided from the contents providers, and provide a user interface for users to select the contents, or input various instructions, or display corresponding outputs. Further, the network operator 10 also provides data for updating the firmware or software of the network TV 30. The network operator 10 may be the same as the manufacturer of the network TV 30.

The contents provider 20 produces a variety of contents that can be provided on the network and makes them in a format that the network TV 30 can play, and provides the contents in accordance with request of the network TV 30. The contents according to the present invention may be any multimedia contents that can be serviced through the network.

Depending embodiments, the contents provided from the contents provider 20 may be provided to the network TV 30 through internet directly from the contents provider 20, or may be provided to the network TV 30 through the network operator 10.

The network TV 30 may be provided with an exclusive firmware for playing and searching the contents from the contents provider 20, and displaying lists. The firmware may be installed in the network TV in manufacturing the network TV 30, or users may download and install the firmware from the contents provider 20 or the network operator 10, while using the firmware.

The firmware of the network TV 30 may be a program for playing or executing the contents provided from the contents provider 20. The firmware depends on the types of contents provided from the contents provider 20. For example, the firmware may be a VOD play program, when the contents provider 20 is a VOD operator. The firmware may be an AOD or MOD play program, when the contents provider 20 is an AOD or MOD operator. When the contents provider 20 is a video communication operator, the firmware may be a video communication program.

The network TV 30 receives, and plays or executes the contents from the contents provider 20. The network TV 30 of the present invention includes a TV equipped with a network module, a broadcast receiver, such as a set top box, and any display device equipped with a network module, such as a telephone for network. Although a broadcast receiver having a function of receiving broadcast is exemplified herein, embodiments of the present invention can be applied to any display devices that can connect to a network and all of which are included in the scope of the present invention.

In more detail, the contents provider 20 may be an operator that produces or distributes various contents to provide to the network TV 30. The contents provider 20 may include a TV station, a radio station, a VOD operator, an AOD operator, a game operator, a video call service provider, a weather information provider, a photo-related service provider etc.

The TV station implies the existing terrestrial or cable broadcasting station and the broadcasting station can produce and store programs that the TV audience can watch, and can convert and transmit the programs in a digital format.

The radio station provides audio contents, and may provide the audio contents with video contents or only the audio contents without video contents.

The VOD operator or the AOD operator has features different from the TV station or the radio station. That is, the VOD or the AOD operator allows users to save desired TV programs, movies, or music, and then play them. For example, when a user had no time to watch a desired program and couldn't watch it, the user can download or play the corresponding file to watch it by connecting to a site that provides this broadcasting service.

The AOD operator provides audio contents streaming service.

The MOD (Music On Demand) service provider allows users to download and listen to desired music.

The video communication service provider provides a relay service to allow for a video call with a user who uses another network TV, through the network. The weather information provider provides local weather information and the photo-related service provider provides tools for editing and saving photographs.

In addition, the contents provider 20 may be any server operator who can provide various services to the network TV through the internet, such as a PF (Packet Filter) server, an EPG service provider, an ECG (Electronic Content Guide) service provider, and a portal server operator etc.

The PF server is serviced by a company that manages as a substitute all broadcasting information and location information provided by the contents provider. This service usually contains broadcasting time of a corresponding broadcasting station, location information needed for broadcasting, and information that a user can contact.

The EPG service provides EPG information for users to search broadcasting programs for each time period and each channel.

The ECG service provides a user with information on contents that the contents provider has, the location of a connection server, and access authority to the connection server. That is, it is an electronic program guide that informs in detail a function that allows for easily connecting to servers having the contents, and information of the contents.

The portal server is a type of web services provided by each broadcasting station, and connects to the web server of broadcasting stations or companies providing contents, when receiving a request from users' terminals. The function of the portal server is to make it possible to search program lists provided by the broadcasting stations and contents providers providing contents service.

The network TV 30 basically has a network interface to be able to be connected to a network and is provided with an IP address to process a data packet through the network, and may store or play the data packet when the data packet is multimedia data, such as a video or audio.

The network TV 30 can operate to bi-directionally transmit the users' requests while processing multimedia data. Further, it is preferable that the user input unit for controlling the network TV 30, such as a remote controller or operation buttons, is provided with buttons for controlling the network TV, that is, buttons for selecting various menus.

Figure 2:
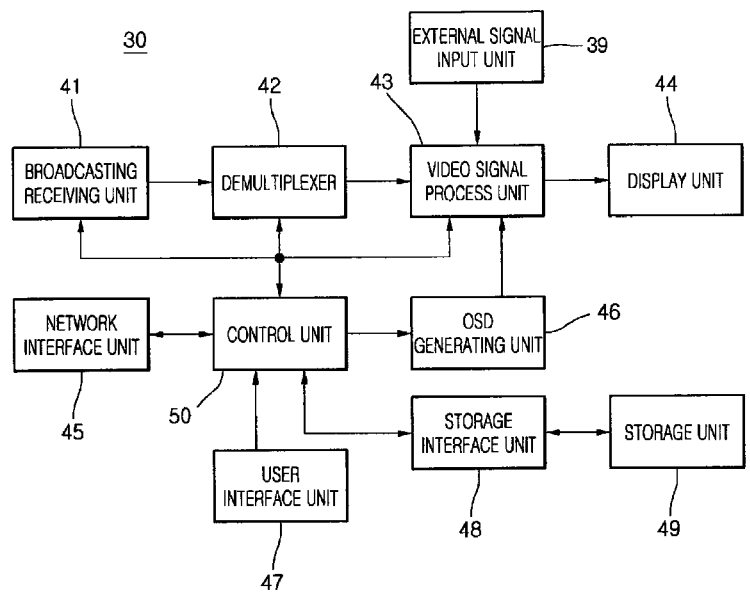
FIG. 2 is a schematic block diagram of the configuration of the network TV according to an embodiment of the present invention.

The configuration and operation of the network TV 30 described above are described hereafter in detail. FIG. 2 is a schematic block diagram of the configuration of the network TV 30 according to an embodiment of the present invention.

Other than the function of receiving contents through a network, the network TV 30 may be provided with a function of receiving RF signal type broadcast signals by wireless communication or through a cable, using the broadcast receiving unit 41.

The network TV 30 according to an embodiment of the present invention includes, as shown in FIG. 2, a broadcast receiving unit 41, a demultiplexer 42, a video signal process unit 43, a display unit 44, a network interface unit 45, an OSD generating unit 46. a user interface unit 47, a storage interface unit 48, a storage unit 49, an external signal input unit 39, and a control unit 50.

In the components described above, the broadcast receiving unit 41, demultiplexer 42, and video signal process unit 43 can constitute one broadcast process unit that receives broadcast signals and processes them into a type which can be outputted to the display unit 44, by performing various processes.

When contents are provided by digital broadcasting, digital broadcast signals are transmitted in transport stream type packeted by time-division multiplexing video signal, audio signals, and addition data.

The broadcast receiving unit 41 may include an antenna receiving broadcast signals transmitted from the outside, and may also include a tuner that tunes a broadcast signal having a corresponding frequency band in accordance with a tuning control signal of the control unit 50, which is described below, and a demodulator that outputs the broadcast signal of a predetermined tuned channel by performing a VSB (Vestigial Sideband) modulating process and an error correcting process to the broadcast signal.

The broadcast signal received by the broadcast receiving unit 41 is divided into various additional data defined as a video signal, an audio signal, and a PSIP (Program and System Information Protocol) information etc. by the demultiplexer 42, and then outputted in a bit stream type.

The video data separated by the demultiplexer 42 is processed by the video signal process unit 43 and displayed by the display unit 44.

In this configuration, the video signal process unit 43 includes an MPEG-2 decoder and a scaler that converts the video data to meet vertical frequency, resolution, picture ratio, etc., corresponding to output standards of the display unit 44. In this configuration, the display unit 44 may be various types of displays, such as a DLP (Digital Light Processing), an LCD (Liquid Crystal Display), PDP (Plasma Display Panel) etc.

Further, the audio signal is processed by a voice signal process unit (not shown) and outputted from a speaker, in which the voice signal process unit may include an AC-3 decoder. On the other hand, the additional data included in the additional data separated by the demultiplexer 42 is stored in the storage unit 49 through the storage interface unit 48, which is described below.

The storage unit 49 may be implemented by EEPROM (electrically erasable programmable read-only memory) etc.

The user interface unit 47 is a means for receiving a request instruction from a user and generally includes an infrared receiving unit that receives an infrared signal inputted by a remote controller or a local key input unit disposed at one side of a panel.

The network interface unit 45 receives contents or data from the contents provider 20 or the network operator 10 through the network. That is, it receives contents, such as broadcast, games, VODs, broadcast signals, provided from the contents provider and the associated information. Further, it also receives the updated information of a firmware and updated which the network operator 10 provides through the network interface unit 45.

The OSD generating unit 46 generates a menu picture for receiving the user's determination signal in an OSD (On Screen Display) type.

That is, the OSD generating unit 46 can display the contents received through the network interface unit 45 and the associated information through the display unit.

The external signal input unit 39 is an interface that can receive an input from other players, for example, DVD players, game machines, etc. It is possible to output multimedia stored in other players to the display unit 44 by connecting the players to the external signal input unit 39.

The control unit 50 controls the overall operations in accordance with the instructions inputted from the user interface unit 47. The control unit 50 receives and executes software of the contents provider 20 received from the network operator 10, i.e. the updated file of the firmware.

Depending on embodiment, the broadcast receiving apparatus 30 according to the present invention may output a 3D-image. The menu screen of the broadcast receiving apparatus 30 can be provided in 3D and can also receive and output 3D-contents, when the contents provided by the contents provider 20 is 3D-contents.

Figure 3:
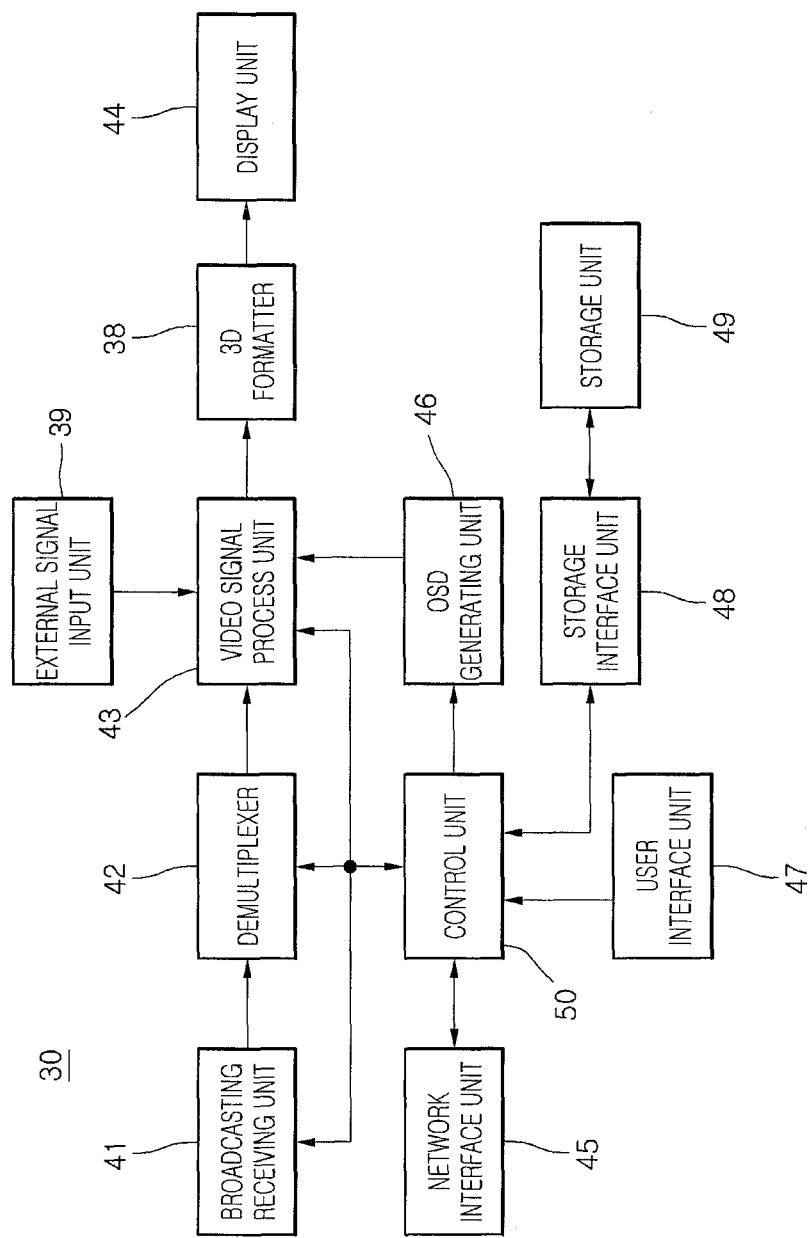
FIG. 3 is a block diagram illustrating the configuration of a network TV hat can implement a 3D-image according to an embodiment of the present invention.

Additional components are required to output a 3D-image. FIG. 3 illustrates the configuration of a broadcast receiving device that can process a 3D-image according to an embodiment of the present invention. The operation of the other components except for a 3D-formatter is the same as that of FIG. 2.

As shown in FIG. 3, the 3D-formatter 38 is disposed at the output end of the video signal process unit 48. The 3D-formatter 38 converts the image processed by the video signal process unit 48 into a 3D-image and transmits it to the display unit 44. Depending on embodiment, a specific 3D-formatter that converts an OSD output into 3D may be included in the OSD generating unit 46.

The configuration shown in FIG. 3 is nothing but an example, and various known technologies can be used to process a 3D-image.

Figure 4:
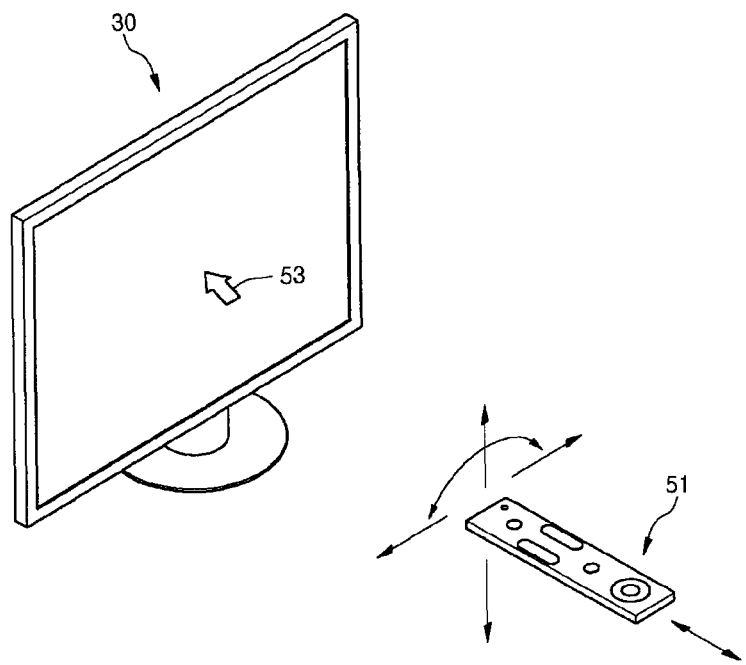
FIGS. 4 and 5 show an example of a remote controller for controlling the network TV shown in FIG. 2 or 3.
Figure 5:
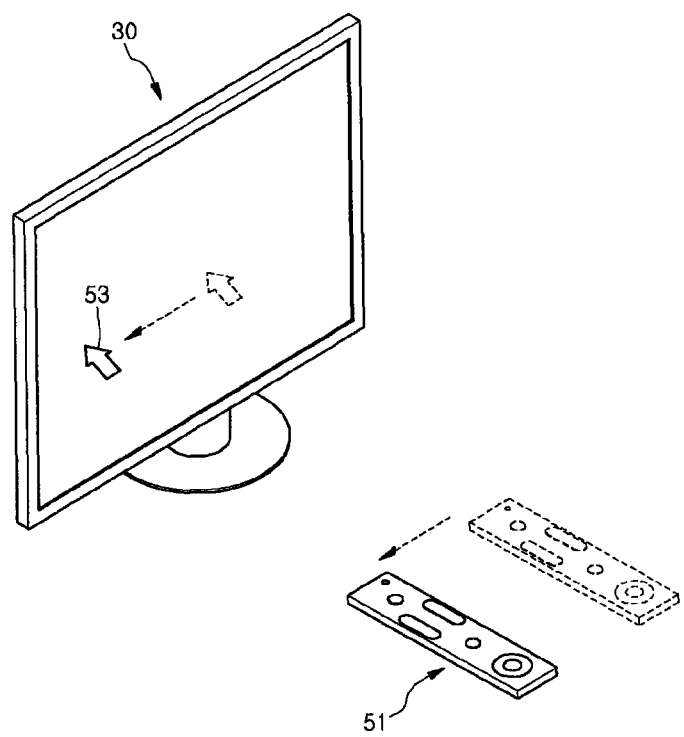
Figure 6:
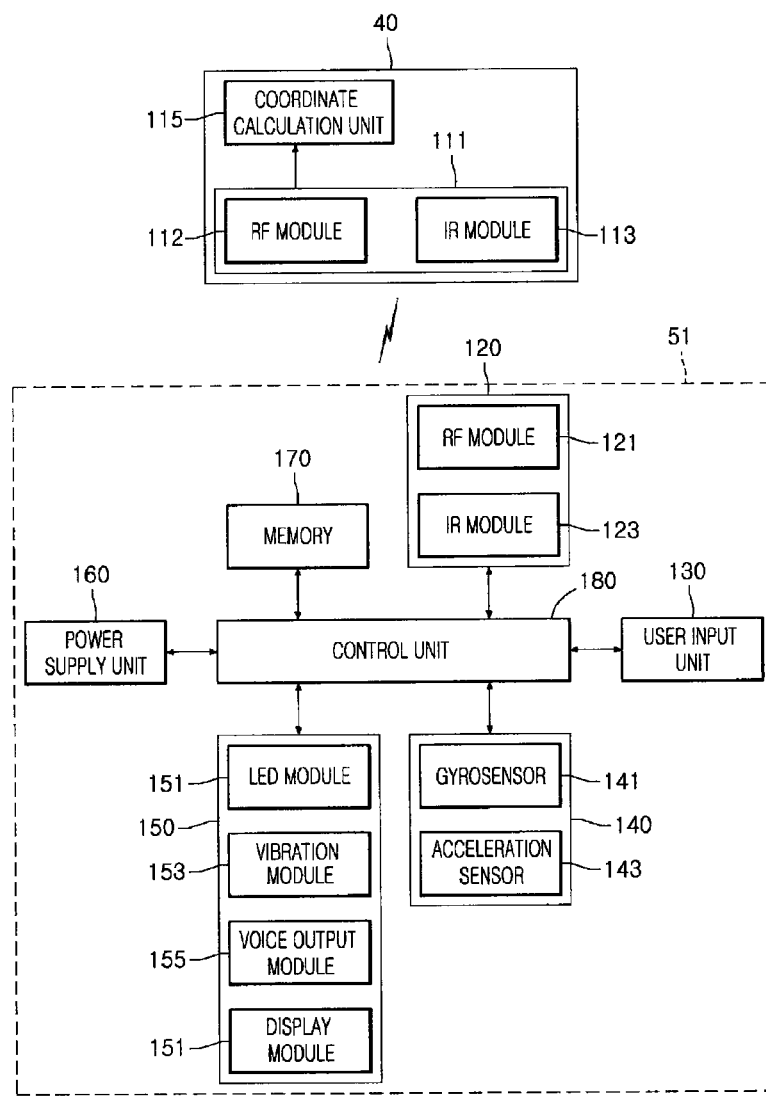
FIG. 6 is a block diagram illustrating the inside of an interface unit of the network TV shown in FIG. 1 and the motion recognition remote controller shown in FIG. 3.

FIGS. 4 and 5 show an example of a remote controller for controlling the network TV 30 shown in FIG. 3. The remote controller can transmit a control signal to the control unit 50 through a wireless signal receiver that can be included in the user interface unit 47 and receives wireless signals, such as an RF signal and an infrared signal. The remote controller described with reference to FIGS. 4 to 6 is a remote controller that responses to not only a button input by a user, but a user's gesture, and which is referred to as a motion recognition remote controller 51 hereafter.

In the present embodiment, the motion recognition remote controller 51 can transmit/receive a signal to/from the network TV 30 in accordance with an RF communication regulation. As shown in FIG. 4, a pointer 53 can be displayed at a position pointed by the motion recognition remote controller 51 on the network TV.

A user can move or rotate the motion recognition remote controller 51 up/down, left/right, and forward/backward. The pointer 53 displayed on the network TV 30 responds to the movement of the motion recognition remote controller 51. FIG. 5 shows when a pointer displayed on the network TV 30 moves in response to the movement of the motion recognition remote controller 51.

As shown in FIG. 4, when a user moves the motion recognition remote controller 51 to the left, the pointer displayed on the network TV 30 correspondingly moves to the left. The motion recognition remote controller 51 may have a sensor that can recognize movement in this embodiment. Information on the movement of the motion recognition remote controller 51 which has been detected by the sensor of the motion recognition remote controller 51 is transmitted to the network TV 30. The network TV 30 determines the movement of the motion recognition remote controller 51 on the basis of the information on the movement of the motion recognition remote controller 51 and calculates corresponding coordinates of the pointer 53.

An acceleration sensor, a gyrosensor, or a geomagnetic sensor can be used for the sensor that can recognize movement. FIGS. 4 and 5 show an example when the pointer 53 displayed on the display 49 moves in response to up/down and left/right movement or rotation of the motion recognition remote controller 51. The movement velocity or direction of the pointer 53 may respond to the movement velocity or direction of the motion recognition remote controller 51.

In this embodiment, a pointer displayed on the network TV 30 is set to move in response to motion of the motion recognition remote controller 51. According to another example, a predetermined instruction may be inputted to the network TV 30 in response to motion of the motion recognition remote controller 51. That is, when the motion recognition remote controller 51 moves forward/backward, the size of an image displayed on the network TV 30 can be increased or decreased.

FIG. 6 is a block diagram illustrating the insides of the interface unit 47 of the network TV 30 of FIG. 1 and the motion recognition remote controller 51 of FIG. 4.

Referring to the figure, the network TV 30 described above may include a coordinate calculation unit 115 and a wireless communication unit 111. The coordinate calculation unit 115 may be included in the control unit 50 described above. The wireless communication unit 111 may be included in the user interface unit 47 described above. The wireless communication unit 111 may include an RF module 112 or an IR module 113.

Meanwhile, the motion recognition remote controller 51 may include a wireless communication unit 120, a user input unit 130, a sensor unit 140, an output unit 150, a power supply unit 160, a memory 170, and a control unit 180.

The wireless communication unit 120 transmits/receives a signal to/from the network TV 30. In this embodiment, the motion recognition remote controller 51 may have an RF module 121 that can transmit/receive a signal to/from the interface unit 40 of the network TV under the RF communication regulation. Further, the motion recognition remote controller 51 may have an IR module 123 that can transmit/receive a signal to/from the interface unit 40 of the network TV under the IR communication regulation.

In this embodiment, the motion recognition remote controller 51 transmits a signal carrying information on motion of the motion recognition remote controller 51 to the network TV 30, using the RF module 121. Further, the motion recognition remote controller 51 can receive a signal transmitted from the network TV 30, using the RF module 121. Further, the motion recognition remote controller 151 can transmit, if needed, an instruction about power-on/off, a channel change, a volume change etc. to the network TV, using the IR module 123.

The user input unit 130 may include a key pad or buttons. A user can input an instruction relating to the network TV 30, using the motion recognition remote controller 51, by operating the user input unit 130. When the user input unit 130 has a hard key button, a user can input an instruction relating to the network TV 30, using the motion recognition remote controller 51, by pressing the hard key button. When the user input unit 130 has a touch screen, a user can input an instruction relating to the network TV 30, using the motion recognition remote controller 51, by touching the soft key of the touch screen. Further, the user input unit 130 may have a variety of input means that a user can operate, such as a scroll key or a jog key, and this embodiment does not limit the scope of the present invention.

The sensor unit 140 may include a gyrosensor 141 or an acceleration sensor 143, as a motion sensor. The gyrosensor 141 can detect movement of the motion recognition remote controller 51. For example, the gyrosensor 141 can sense information on movement of the motion recognition remote controller 51, about x-, y-, and z-axes. The acceleration sensor 141 can sense information on movement velocity etc. of the motion recognition remote controller 51. The output unit 150 can output an image or voice signal corresponding to operation of the user input unit 130 or a signal transmitted from the network TV 30. A user can recognize whether the user input unit 130 is operated or the network TV 30 is controlled, from the output unit 150.

For example, the output unit 150 may have an LED module 151 that is turned on/off, a vibration module 153 that vibrates, a voice output module 155 that outputs voice, or a display module 157 that outputs video, when the user input unit 130 is operated or the network TV 30 transmits/receives a signal to/from the wireless communication unit 120.

The power supply unit 160 supplies power to the motion recognition remote controller 51. The power supply unit 160 can reduce the waste of power by stopping supplying power, when the motion recognition remote controller does not move for a predetermined period of time. The power supply unit 160 can start again to supply power, when a predetermined key of the motion recognition remote controller 51 is operated.

The memory 170 can store various types of application data for operating or controlling the motion recognition remote controller 51. If the motion recognition remote controller 51 transmits/receives a signal by wireless to/from the network TV 30, using the RF module 121, the motion recognition remote controller 51 and the network TV 30 transmit/receive a signal in a predetermined frequency band. The control unit 180 of the motion recognition remote controller 51 can store information on the frequency band where wireless communication of a signal with the network TV 30 paired with the motion recognition remote controller 51 to the memory 170, and refers to it.

The control unit 180 controls the overall matters relating to controlling the motion recognition remote controller 51. The control unit 180 can transmit a signal corresponding to the operation of a predetermined key of the user input unit 130 or a signal corresponding to the operation of the motion recognition remote controller 51 sensed by the sensor unit 140, to the wireless communication unit 111 of the network TV 30, using the wireless communication unit 120.

As described above, the network TV 30 can have the wireless communication unit 120 that can transmit/receive a signal by wireless to/from the motion recognition remote controller 51 and the coordinate calculation unit 115 that can calculate coordinates of the pointer, which correspond to motion of the motion recognition remote controller 51.

The wireless communication unit 111 can transmit/receive a signal by wireless to/from the motion recognition remote controller 51, using the RF module 112. Further, it can receive a signal transmitted from the motion recognition remote controller 51, using the RF module 112, under the IR regulation.

The coordinate calculation unit 115 can calculate coordinates (x, y) of the pointer 53 that will be displayed on the display 49 by correcting hand tremble or an error, on the basis of a signal corresponding to motion of the motion recognition remote controller 51 which has been received through the wireless communication unit 111.

Further, the signal transmitted from the motion recognition remote controller 51 to the network TV 30 through the interface unit 40 is transmitted to the control unit 47 of the network TV 30. The control unit 47 recognizes information on key operation and motion of the motion recognition remote controller 51 on the basis of the signal transmitted from the motion recognition remote controller 51 and can control the network TV 30 on the basis of the recognized result.

The menu screen of the network TV and a method of operating the menu screen according to an embodiment of the present invention are described hereafter.

Figure 7:
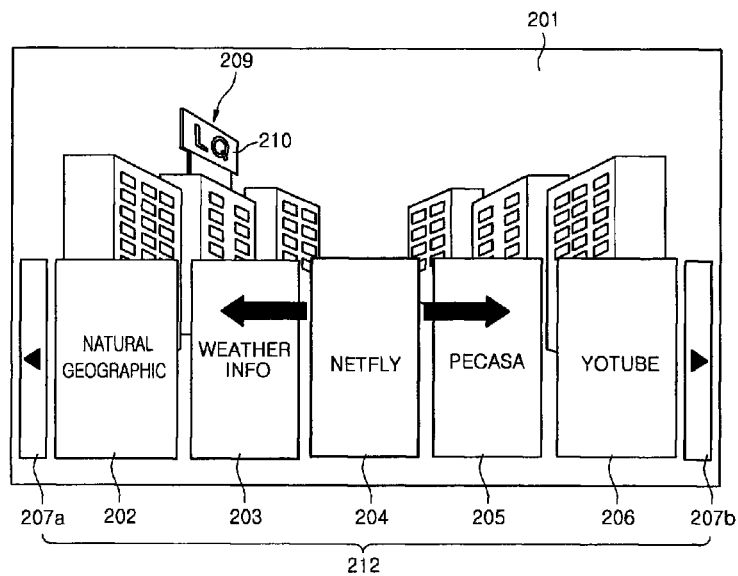
FIG. 7 is a view showing a menu screen of the network TV according to an embodiment of the present invention.

The 'menu screen' of the network TV 30 according to an embodiment of the present invention is an initial screen or a main screen when the network TV 30 enters an operation mode (hereafter, referred to as netcast mode) that provides a menu allowing the network TV 30 to select and connect with one of a plurality of contents providers. The menu screen may include a plurality of icons 212 representing a plurality of contents providers, and may also include a background image 201 having a specific subject, depending on embodiments. FIG. 7 is a view showing a menu screen of the network TV 30 according to an embodiment of the present invention.

An image of city is shown as the background image 201 of the menu screen in FIG. 7, and icons 212 representing contents providers are shown over the main screen. The image of the menu screen can have a specific subject, other than the city shown in FIG. 7, it may have various subjects, such as a jungle, a department store, a beach, the universe, and a scene of fairy tales. The background image can include graphic objects that can be selectively inserted with a basic image and other images corresponding to the subject.

The icons 212 are buttons for connecting with a plurality of contents providers and a user can be provided with desired services by selecting one of the icons 212 to connect with the selected contents provider. Preferably, the icons 212 may relate to the background image 201. That is, the icons 212 may be graphic objects corresponding to the subject of the background image 212. For example, as shown in FIG. 7, the icons 212 can be displayed in the shape of a structure or a signboard on the road of a city. The images displayed on the icons 212 can be provided by the contents providers, respectively.

When the background image 201 is changed in accordance with user's information, for example, the area, the icons 212 or the images displayed on the icons 212 can be changed.

A user can use the motion recognition remote controller 51 with reference to FIGS. 4 to 6 in order to select the icons 212.

As an embodiment of contents providers, there are displayed icons of contents providers of Natural Geographic 202, Weather Information 203, Netfly 204, Pecasa 205, and Youtube 206 in FIG. 7.

Assume that the Natural Geographic 202 is a contents provider that provides contents about the natural science, the Weather Information 203 is a contents provider that provides weather information, the Netfly 204 is a contents provider that provides contents about movies, the Pecasa 205 is a contents provider that provides contents about photographs, and the Youtube 206 is a contents provider that provides contents about VOD (Video on Demand).

Depending on embodiments, various types and numbers of icons can be additionally displayed on the menu screen, other than the above icons. Scroll bars 207a and 207b are disposed at the left and right sides of the icons 212, such that additional icons can be displayed when a user selects the scroll bars 207a and 207b.

The user can connect to each of the contents provider servers by selecting one of the icons 212, and watch or use the contents. The configuration of the menu screen or the number, size, position, and arrangement of icons displayed on the menu screen depends on embodiments.

Figure 8:
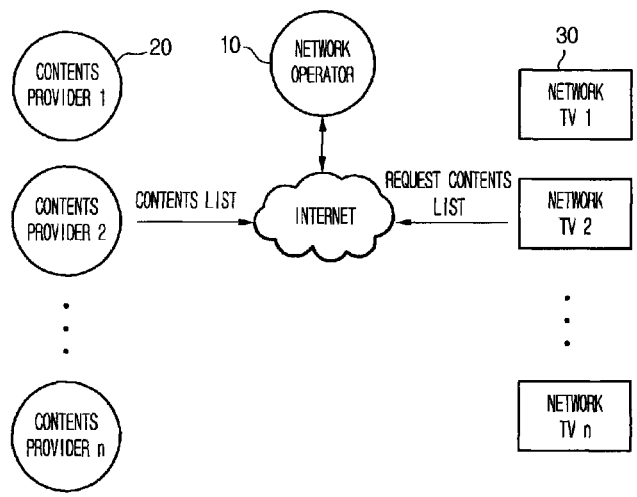
FIG. 8 is a diagram showing the operation performed on a network while contents information is provided in accordance with an embodiment of the present invention.

FIG. 8 is a diagram showing the operation performed on a network while contents information is provided in accordance with an embodiment of the present invention.

As show in FIG. 8, the network TV 30 of the present invention can request providable contents lists to the contents provider 20 through the internet. Depending on embodiments, it may be possible that the network operator 10 stores the providable contents lists of the contents provider 20 and provides the list.

The request for contents list may be sent to all of the contents providers who can connect to the network TV 30, or may be sent to only some contents providers selected by the user. Depending on embodiments, the network TV can request all contents lists that are provided by the contents provider 20, request the newest contents lists, or request popular contents lists, in accordance with the user's input. Alternatively, it is possible to request to contents lists included in a search result by including search words inputted by the user in the contents list request.

The contents provider 20 transmits contents lists, which include all contents that can be provided from the contents provider, newest contents, popular contents, contents corresponding to search results for specific search words, or contents uploaded/downloaded by the user, to the network TV 30, in accordance with the contents list request.

Meanwhile, in accordance with the contents list request, the contents provider 20 can transmit location information making it possible to receive the contents list and the contents included in the contents list, to the network TV 30.

For example, the contents provider 20 can transmit the URL (Uniform Resource Locator) of the server of the contents provider 20, which makes it possible to download corresponding contents, in the contents included in the transmitted contents list, to the network TV 30.

The network TV can be linked to contents selected by the user, using the location information of the received contents, for example, the URL.

Depending on embodiments, when contents of the list is not specified in the contents list request, popular contents list or newest contents list or both of them can be transmitted as the default to the network TV 30.

The contents list request and reception can be performed by user's instruction, with the menu screen of FIG. 7 displayed.

The contents list request transmitted from the network TV can be changed in various ways in accordance with embodiments, and the contents list transmitted in response to the request can be changed in various way, and the changes are included in the scope of the present invention.

According to an embodiment of the present invention, it is possible to perform various control instructions by displaying the received contents list for each contents provider, on the screen.

Figure 9:
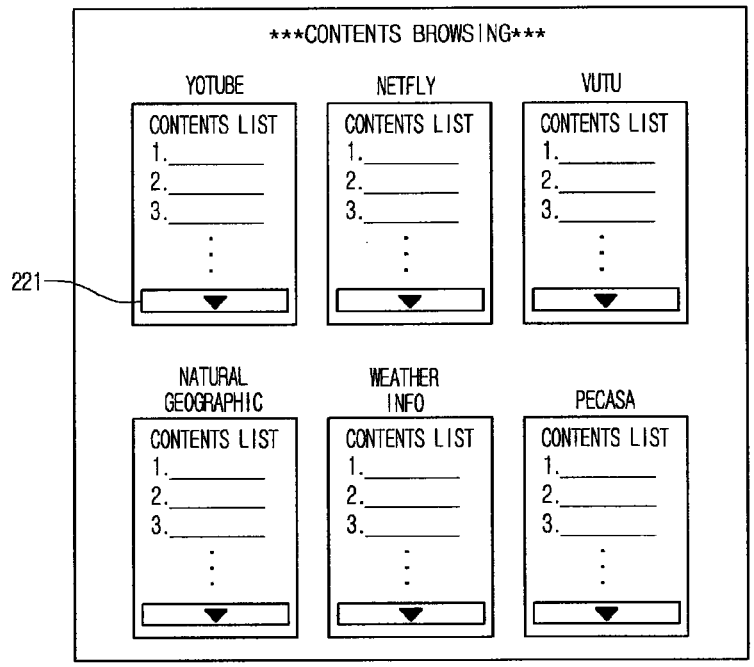
FIG. 9 is a diagram showing a contents browsing screen that displays contents lists for each of a plurality of contents providers, in accordance with an embodiment of the present invention.

FIG. 9 is a diagram showing a contents browsing screen that displays contents lists for each of a plurality of contents providers, in accordance with an embodiment of the present invention.

Referring to FIG. 9, the contents lists received from the contents providers 20, as described above, are displayed for each contents provider, and accordingly, a plurality of contents lists 230 and 235 corresponding to the contents providers 20 can be displayed on the screen of the network TV 30.

In FIG. 9, a specific window is assigned for each contents provider and the list of one contents provider is displayed in one window, but the method of displaying the contents list may be modified in various ways. A scroll bar for showing additional contents can be disposed in each contents window.

As described above, the contents lists may be the contents lists, which include all contents that can be provided from the contents provider, newest contents, popular contents, contents corresponding to search results for specific search words, or contents uploaded/downloaded by the user, in accordance with the contents list request. The contents lists may include information, such as the title, category, running time of the contents.

Meanwhile, the control unit 50 of the network TV 30 can link the location information of the contents received with the contents list, for example, the URL with the corresponding contents, and accordingly, it can control the network interface unit 45 to receive the selected contents by using the URL, which is the linked location information, when the user selects the contents.

In FIG. 9, although it is assumed that six contents providers can connect to the network TV 30, the number and types of the contents providers may be freely changed in accordance with embodiments. Further, the number of contents providers that is displayed in one screen and the number of contents that is displayed in the contents list may be changed in accordance with embodiments.

Meanwhile, the number of contents included in the contents list transmitted from the contents provider 20 may exceed the number of contents that can be displayed in the screen, in which the user can sequentially check the other contents, which are not displayed now, by using the direction keys displayed in the corresponding contents list.

For example, the user can make the other contents, which are not display, sequentially displayed one by one by selecting the direction key 221 at the lower end of the contents list 230, in order to check the other contents that are not displayed now in the contents list 230 of the "YOUTUBE" contents provider.

The user can directly select and watch contents in the contents browsing screen, as shown in FIG. 9, without specifically connecting to the contents provider servers. Further, the user can control the contents in various ways by selecting the contents in the contents browsing screen.

For example, the control unit 50 of the network TV 30 can store the URL, which is the location information of the contents provided from the contents provider 20, and the service ID (Identification), which is the login information for access to the server of the corresponding contents provider 20, in the storage unit 49 through the storage interface unit 48.

Further, when the user wants to select and watch contents included in the contents list, the control unit 50 can allow the network interface unit 45 to connect to the server of the corresponding contents provider 20 and receive the selected contents, by using the URL and the service ID stored in the storage unit 49.

Figure 10:
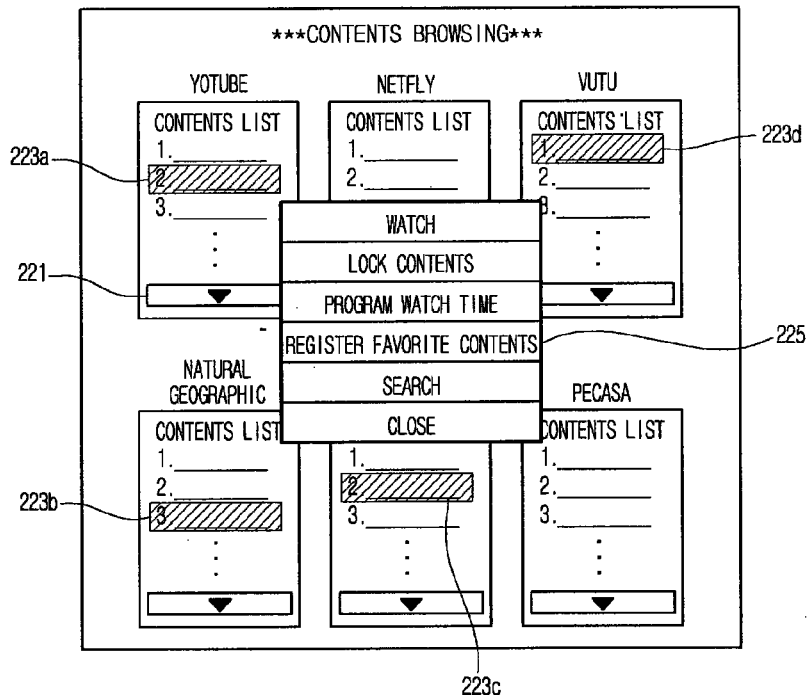
FIG. 10 is a diagram illustrating a method of controlling contents selected from a contents browsing screen in various ways, in accordance with an embodiment of the present invention.

Referring to FIG. 10, the user can select at least one content, using the direction keys in common remote controllers, preferably the motion recognition remote controller described with reference to FIGS. 5 and 6. The selected contents 223a, 223b, 223c, 223d are highlighted in FIG. 10.

The menu 225 can be displayed, when the user selects the menu after selecting the contents. The menu 225 may include menus for watching the selected contents or various control instructions for the selected contents.

When the user selects 'watch' in the menu 225, the selected contents can be sequentially played. When the user selects 'lock contents', a menu for setting passwords of the selected contents is provided, or the contents may disappear from the contents browsing screen. When the user selects 'program watch time', a watch time menu is displayed in the selected contents such that a watch time is stored and the selected contents can be automatically played at the corresponding time. When the user selects 'register favorite contents', the contents are registered in the favorite contents group of the user. A plurality of favorite contents groups may exists and the user can select a contents group to store the selected contents. When the user selects 'search', the received contents list shown in FIG. 11 can be searched.

Figure 11:
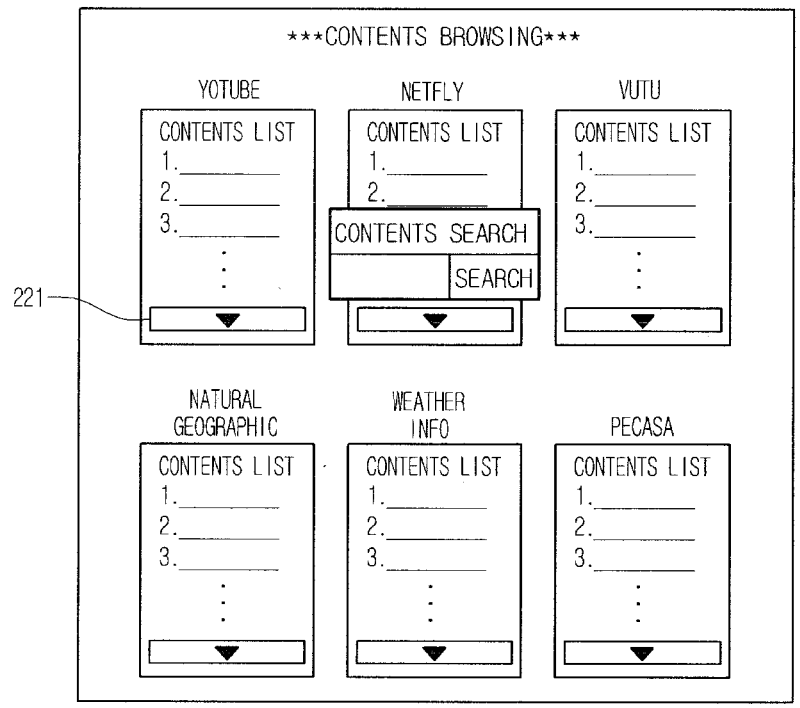
FIGS. 11 and 12 are diagrams illustrating a method of searching contents from a contents browsing screen, in accordance with an embodiment of the present invention.
Figure 12:
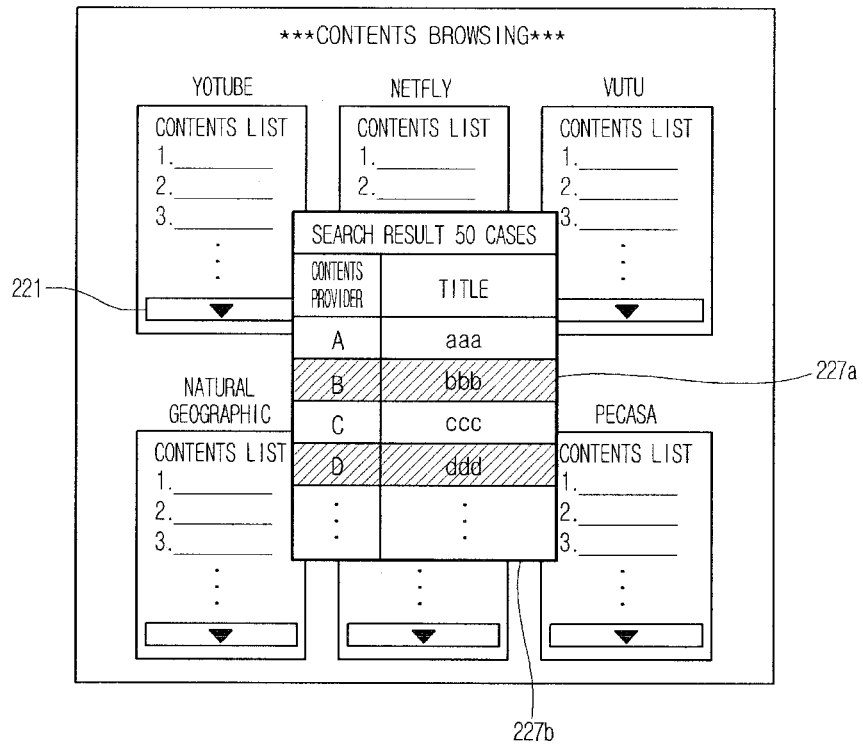

A search window is displayed, as shown in FIG. 11, when the user inputs a search word and performs search, the search result shown in FIG. 12 can be displayed. The contents provider and the contents title can be included in the search result. The user can select 227a, 227b and watch contents from the search result, or perform various controls, such as 'lock contents', 'program watch time', and 'register favorite contents', for the selected contents.

Figure 13:
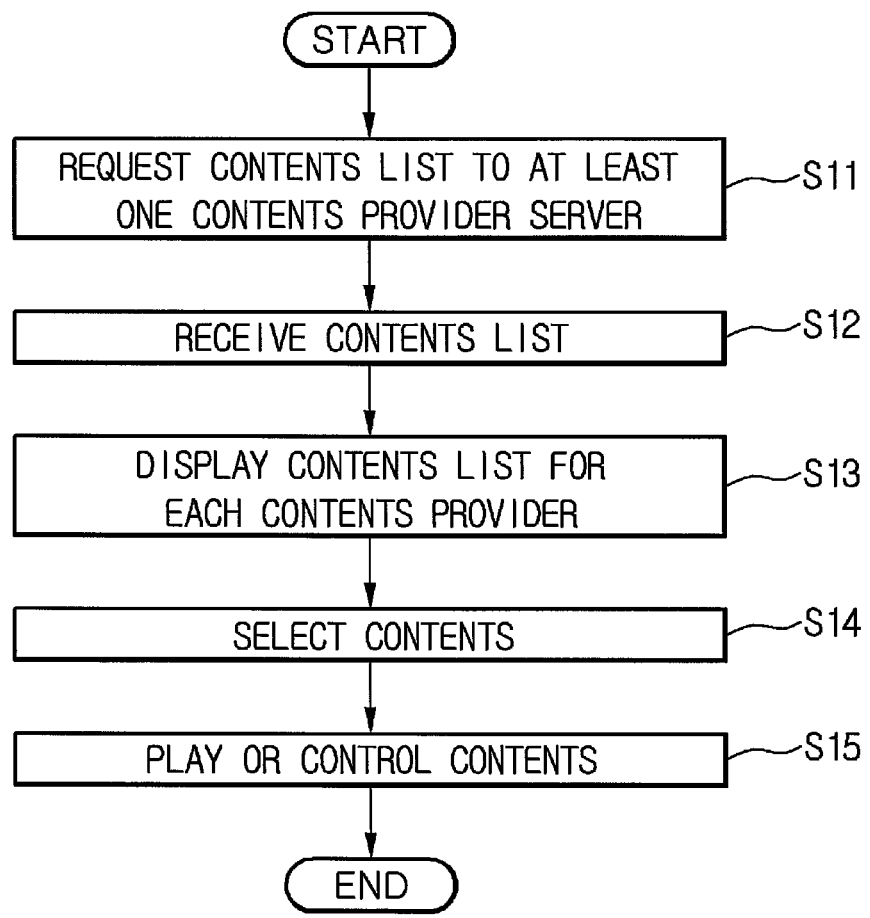
FIG. 13 is a flowchart illustrating a method of providing contents information according to an embodiment of the present invention.

FIG. 13 is a flowchart illustrating a method of providing contents information according to an embodiment of the present invention.

In step S11, a contents list request is transmitted to at least one contents provider server. The contents list request can include all contents, which can be provided from the contents provider, newest contents, request of popular contents, and request of contents list of the search result for specific search words. In step S12, contents lists corresponding to the contents list requests are transmitted from the contents providers. In step S13, the received contents lists are displayed for each contents provider.

Meanwhile, in step S12, the network TV 30 can receive the URL information of the contents included in the contents list, together with the contents list, from the contents providers 20, and can link them to the corresponding contents by using the received URL information.

In step S14, when the user select contents from the displayed list, the selected contents is played or a control instruction is performed in accordance with the user input in step S15.

According to an embodiment of the present invention, update information on contents designated by the user in the contents provided through the network can be provided. That is, when the contents designated by the user are uploaded to the contents provider server, the user can be provided with information on the contents. The contents designated by the user may be the contents registered as favorite contents by the user. The contents relating to the contents designated by the user may be a succession or a series of the contents designated by the user.

Referring to FIG. 8 again, the network TV 30 transmits the contents designated by the user to the contents providers 20, for example, transmits update information of the contents registered as favorite contents to the contents providers 20. In detail, the network TV 30 transmits update request with information on the contents designated by the user to the contents providers 20. The contents update information request can be transmitted to the contents provider who provides the contents designated by the user. The contents providers 20 search whether there is newly updated content on the basis of the received contents information, and transmits the information to the network TV 30, when there is updated content.

The contents update information request described above can be automatically performed when a mode in which the user can be provided with contents through a network, that is, a netcast mode is performed, or when the user turns on the network TV 30.

FIG. 14 is a diagram showing a screen providing update information of user-designated contents, in accordance with an embodiment of the present invention. As shown in FIG. 14, the update information of the user-designated contents may include the contents provider, the contents title, and the updated list. The updated list may be information that the a succession or a series of the user-designated contents has been uploaded. When the user select contents in the screen shown in FIG. 14, a webpage for watching the corresponding updated contents is connected.

Figure 15:
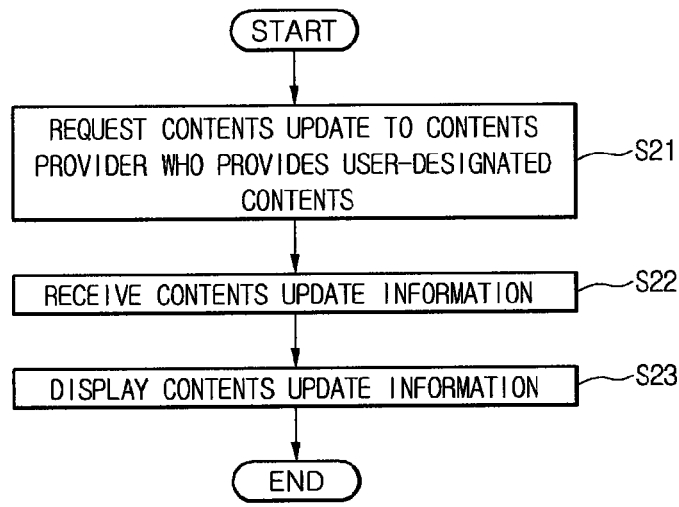
FIG. 15 is a diagram showing a method providing update information of user-designated contents in a network TV, in accordance with an embodiment of the present invention.

FIG. 15 is a diagram showing a method providing update information of user-designated contents in a network TV, in accordance with an embodiment of the present invention.

In step S21, a signal requesting the update information of the user-designated contents is transmitted to the contents providers. The request is transmitted to the contents providers who provides the user-designated contents, for each of contents. The update information request may be automatically performed when the user performs the netcast mode, or the user turns on the network TV. In step S22, content update information is received for each of contents. In step S23, the received contents update information is displayed. The user can directly connect to the webpage for watching or playing the updated contents, through the screen displaying the updated information.

According to an embodiment of the present invention, the user can set up the type of the contents included in the contents list to any one of all contents that can be provided from the contents provider, newest contents, popular contents, contents corresponding to search results for specific search words, or contents uploaded/downloaded by the user.

Figure 16:
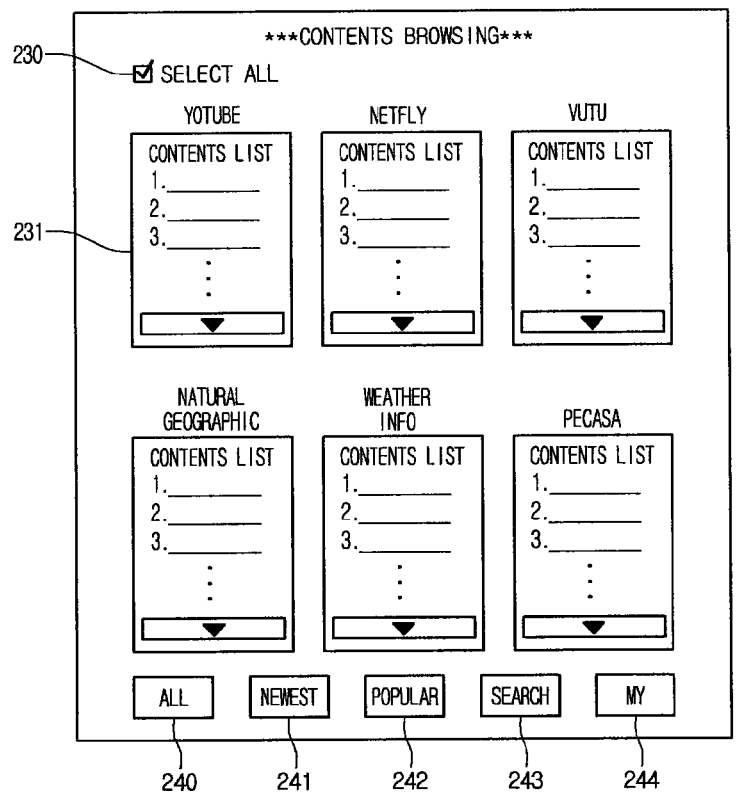
FIG. 16 is a diagram showing an embodiment of a method of displaying a plurality of contents lists in accordance with the types of contents selected by a user.

FIG. 16 is a diagram showing an embodiment of a method of displaying a plurality of contents lists in accordance with the types of contents selected by a user.

Referring to FIG. 6, a plurality of button 240 to 244 that allows the user to set up the contents type can be displayed on the screen.

For example, when the user selects the "ALL" button 240, the all the contents that can be provided by the contents provider 20 may be displayed in the contents list, and when the user selects the "newest" button 241, the newest contents that are provided by the contents provider 20 may be selected and displayed.

Further, when the user selects the "popular" button 242, popular contents, which are frequently downloaded or searched by users, in all of the contents that can be provided from the contents provider 20 may be displayed in the contents list, and when the user selects the "search" button 243, the contents search function described with reference to FIGS. 11 and 12 may be performed.

Further, when the user selects the "MY" button 244, only the contents that the user uploaded and downloaded to/from the server of the contents provider 20 may be included in the contents list.

Meanwhile, the contents type set by the user, as described above, can be transmitted to the contents provider 20 together with the contents list request, and accordingly, the only the information on the contents corresponding to the type selected by the user in all of the contents that can be provided by the contents provider 20 can be transmitted to the contents list.

Further, the user can select a contents provider to apply the contents type set as described above.

For example, as shown in FIG. 16, when the user checks the "select all" box 230, the contents type can be applied to all of the contents providers of which the contents lists are displayed in the screen.

Further, the user can select some of all the contents providers displayed in the screen such that the contents type set as described above can be applied to only the selected contents providers.

According to another embodiment of the present invention, a plurality of contents lists displayed to correspond to a plurality of contents providers, as described above, can be arranged and displayed in accordance with the contents running type.

For example, the contents running time may be the time when the network TV 30 receives contents for watch from the corresponding contents provider for a predetermined time from the current time to a predetermined past time.

That is, the contents list can be arranged and displayed sequentially in accordance with the preference of the user for the corresponding contents provider.

Figure 17:
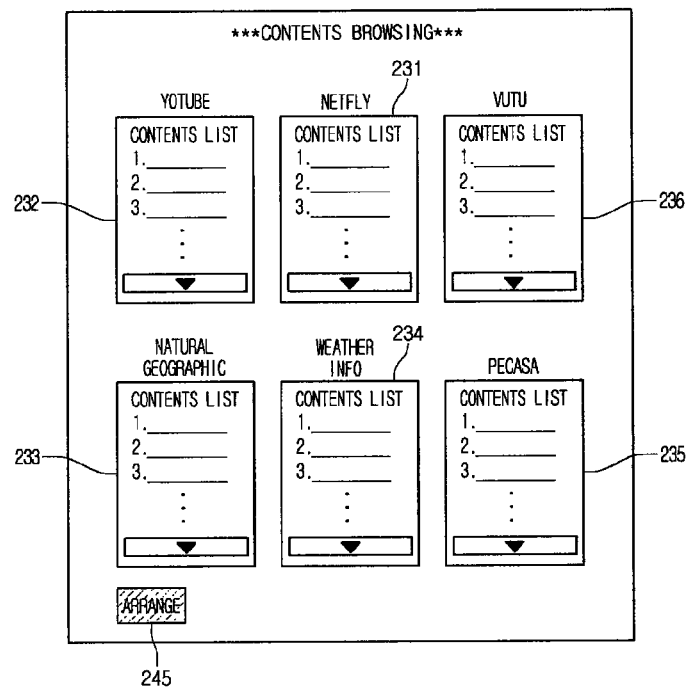
FIG. 17 is a diagram showing an embodiment of a method of displaying a plurality of contents lists arranged in accordance with contents play time.

FIG. 17 is a diagram showing an embodiment of a method of displaying a plurality of contents lists arranged in accordance with contents play time.

For example, the contents provider having the longest contents running time (for example, the contents provider from which the user downloaded the most contents) in the contents providers 210 may be "NETFLY", the next may be "YOUTUBE", and the contents running time may reduce in the order of "PECASA", "VUTU", and "NATURAL GEOGRAPHIC", and the contents provider having the shortest contents running time may be "WEATHER INFO".

In this case, the contents lists 230 to 236 corresponding to the contents providers 20, respectively, may be arranged in accordance with the order of contents running time and displayed on the screen.

Referring to FIG. 17, when the user selects the "arrange" button on the screen, the contents lists 230 to 236 can be rearranged in the order of the contents list 232 of "NETFLY", the contents list 231 of "YOUTUBE", the contents list 236 of "PECASA", the contents list 233 of "VUTU", the contents list 234 of "NATURAL GEOGRAPHIC", and the contents list 235 of "WEATHER INFO", in accordance with the order of the contents running time.

Meanwhile, the contents lists may be displayed in different size in accordance with the contents running time for the corresponding contents providers.

Figure 18:
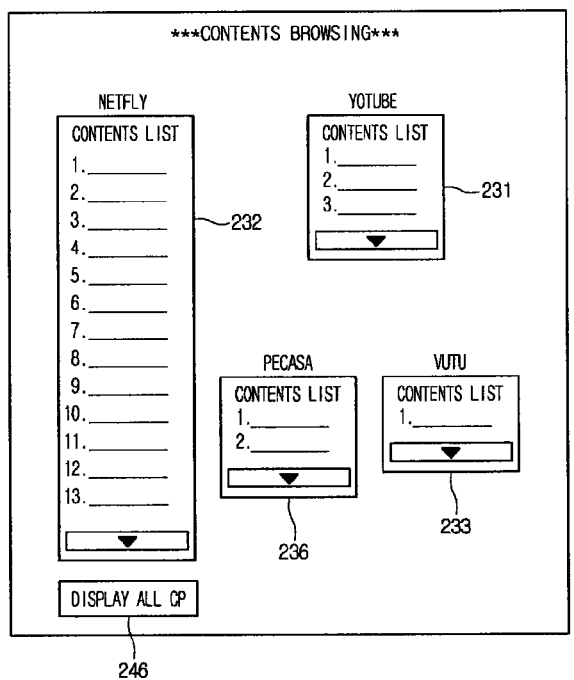
FIGS. 18 and 19 are diagrams showing embodiments of a method of displaying a plurality of contents lists indifferent sizes.

Referring to FIG. 18, the contents list 232 of "NETFLY" having the longest contents running time may be displayed in the largest size, and the size may be gradually decreased in the order of the contents list 231 of "YOUTUBE", the contents list 236 of "PECASA", and the contents list 233 of "VUTU".

Further, as shown in FIG. 18, the number of contents displayed in the corresponding contents list can decrease with the decrease of size of the content lists, as described above.

Further, when the contents running time is "0" or smaller than a predetermined reference time, the contents list corresponding to the corresponding contents provider may not be displayed on the screen.

For example, when the contents running time of the user for "NATURAL GEOGRAPHIC" and "WEATHER INFO" is less than the reference time, as shown in FIG. 18, the contents list 234 of "NATURAL GEOGRAPHIC" and the contents list 235 of "WEATHER INFO" may not be displayed on the screen.

Figure 19:
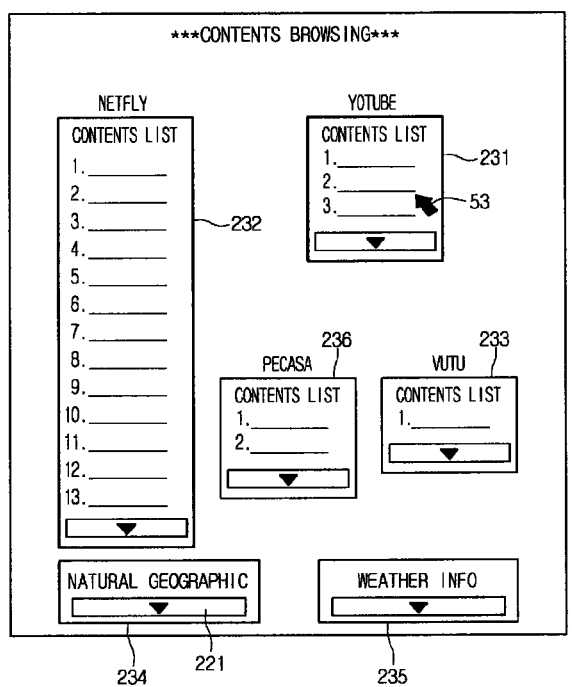

On the other hand, when the user selects the "display all CP" button 246, as shown in FIG. 19, the contents lists 234, 235 corresponding to "NATURAL GEOGRAPHIC" and "WEATHER INFO", respectively, can be displayed on the screen.

However, detailed information on the contents may not be displayed in the contents lists 234, 235 corresponding to "NATURAL GEOGRAPHIC" and "WEATHER INFO".

In this case, the user can select the direction key 221 in the contents list 234 such that detailed information on the contents included in the corresponding contents list 234, for example, the title, category, and running time of the contents is displayed on the screen.

Meanwhile, when the user selects any one of the contents lists 230 to 236 displayed in the screen, information on the contents included in the selected contents list can be displayed on the screen.

For example, the user can select the contents list 231 of "YOUTUBE", using the pointer 53, and accordingly, the contents included in the contents list 231 of "YOUTUBE" can be displayed by thumbnail images, which are compressed images of the corresponding contents.

Figure 20:
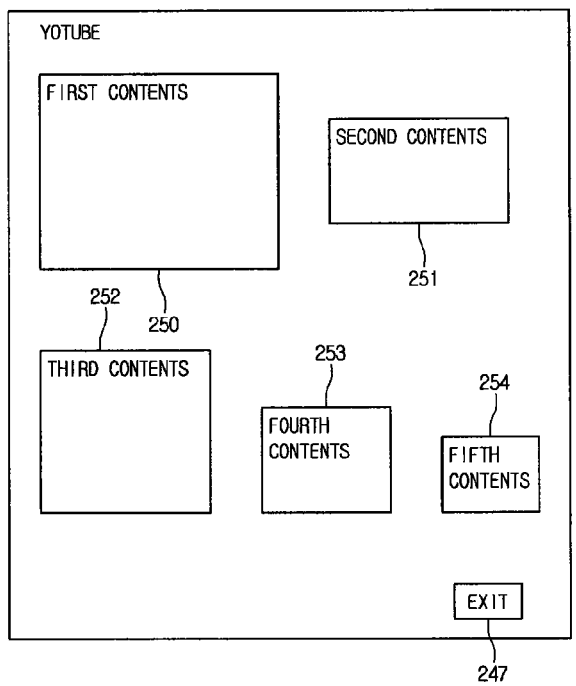
FIG. 20 is a diagram showing an embodiment of a method of displaying contents provided from a contents provider.

Referring to FIG. 20, the contents included in the contents list 231 of "YOUTUBE" selected by the user may be displayed by thumbnail images 250 to 254, respectively.

Meanwhile, the thumbnail images 250 to 254 may be displayed in different sizes in the contents displayed in the screen, in accordance with the time where the corresponding contents have been played.

That is, the first thumbnail image 250 corresponding to the first contents having the longest running time in the contents may be displayed in the largest size, and the second contents, the third contents, the fourth contents, and the fifth contents can be displayed in small thumbnail images with the decreases of running time in that order.

Further, the method for providing contents information according to the present invention to a video call may be programmed to be executed by a computer and stored in a computer-readable recording media, in which the computer-readable recording media may be ROM, RAM, CD-ROM, magnetic tape, floppy disc, and optical data storage, and may be implemented in a carrier wave type (e.g. transmitted by Internet).

Further, the computer-readable recording media are distributed on computer systems connected through the network, and thus the computer-readable recording media may be stored and executed as the computer-readable code by a distribution scheme. Further, functional programs, codes, and code segments for implementing a method of receiving broadcast can be easily inferred by programmers in the related art.

According to an embodiment of the present invention, it is possible to receive and provide contents lists at one time from a plurality of contents providers, and also possible to provide update information on some contents designated by a user.

Further, it is possible for a user to easily search and play desired contents, by displaying a plurality of contents lists in accordance with running time for corresponding contents providers.

Meanwhile, as described with reference to FIGS. 17 to 20, the method of providing contents information may be performed when the network TV 30 is turned on.

In this case the contents running time may be the time when the user receives and watches contents from a contents provider for a predetermined time before the network TV 30 is turned off.

Although embodiments of the present invention are described above, they do not limit the present invention and the scope of the present invention is determined by construing claims. The embodiments may be modified in various ways and the modifications are included in the scope of the present invention.

What is claimed is:

1. A method of providing contents information in a display apparatus connectable to a network, the method comprising:
   requesting a plurality of contents providers to transmit a plurality of contents lists, respectively, wherein the plurality of contents lists correspond to the plurality of contents providers, respectively;
   receiving the plurality of requested contents lists and location information of contents included in each of the plurality of contents lists from the contents providers, respectively, wherein each of the plurality of contents list is a list of a plurality of contents that can be provided by a corresponding contents provider; and
   displaying the plurality of received contents lists on a plurality of areas of a screen, respectively,
   wherein the plurality of contents included in each of the plurality of contents lists are linked based on the location information, and
   wherein displaying the plurality of received contents lists includes displaying, differently, sizes of the plurality of areas in accordance with an access number, and wherein the access number represents a total number of times that the display apparatus has accessed a content provider, in order to obtain a content from the content provider.

2. The method of providing contents information according to claim 1, wherein the location information of the contents includes URL (Uniform Resource Locator) of a server of the contents provider that can receive the contents.

3. The method of providing contents information according to claim 1, wherein one of the plurality of contents list includes all the contents that can be provided from the contents provider or some contents requested by the user in all contents that can be provided from the contents provider.

4. The method of providing contents information according to claim 3, wherein the some contents are any one of a plurality of contents types including newest contents, popular contents, contents requested to be searched by the user, and contents uploaded/downloaded by the user, in all of the contents that can be provided by the contents provider.

5. The method of providing contents information according to claim 4, further comprising:
   receiving the contents type for some contents that will be included in the contents list, for at least any one of the plurality of contents providers,
   wherein the requesting of transmission is transmitting information on the contents type to the contents provider.

6. The method of providing contents information according to claim 1, wherein the contents providers are all of contents providers that can be connected to the display apparatus, or contents providers that are designated by a user in the connectable contents providers.

7. The method of providing contents information according to claim 1, further comprising:
   receiving a selection of at least one of the contents included in the contents list from a user; and
   receiving the contents selected by the user.

8. The method of providing contents information according to claim 1, further comprising performing a control instruction from a user for at least one of the contents included in the contents list.

9. The method of providing contents information according to claim 8, wherein the control instruction includes at least one of locking, programming watch time, and registering favorite contents for the selected contents.

10. The method of providing contents information according to claim 1, further comprising:
- requesting update information of user-designated contents to the contents provider that provides at least one contents designated by a user;
- receiving update information of the user-designated contents; and
- displaying the update information of the received contents.

11. A display apparatus connectable to a network, comprising:
- a display unit; and
- a control unit configured to:
  - request a plurality of contents providers to transmit a plurality of contents lists, respectively,
  - receive the plurality of contents lists and URL (Uniform Resource Locator) information on contents included in each of the plurality of contents lists, from the plurality of contents providers, respectively, wherein the plurality of contents lists correspond to the plurality of contents providers, respectively, wherein each of the plurality of contents list is a list of a plurality of contents that can be provided by a corresponding contents provider
  - control the display unit to display the plurality of contents lists on a plurality of areas of a screen, respectively,
  - link the contents included in the plurality of contents lists with the received URL information, and
  - control the display unit to display, differently, sizes of the plurality of areas based on an access number, wherein the access number is a total number of times that the display apparatus has accessed to a content provider in order to obtain a content from the content provider.

12. The display apparatus according to claim 11, wherein at least one of the contents list is any one of newest contents, popular contents, contents requested to be searched by the user, and contents uploaded/downloaded by the user, in all contents that can be provided from the contents provider.

13. The display apparatus according to claim 11, wherein the control unit performs any one of control instructions of locking, programming watch time, and registering favorite contents for at least one of the contents included in the contents list.

14. The display apparatus according to claim 11, wherein the control unit receives update information of user-designated contents from a contents provider that provides contents designated by the user, and the update information of the received user-designated contents are displayed by the display unit.

15. The display apparatus according to claim 11, wherein a total number of contents in a corresponding contents list is dependent on a size of an area.

16. The display apparatus according to claim 15, wherein the total number of contents in the corresponding contents list is decreased in accordance with the size of the area.

17. The display apparatus according to claim 11, wherein a size of an area corresponding to the most accessed content provider, from among the plurality of areas, is larger than sizes of other ones of the plurality of areas.

* * * * *